United States Patent [19]

Gutowski et al.

[11] Patent Number: 4,740,928

[45] Date of Patent: Apr. 26, 1988

[54] SONIC LOGGING SYSTEM

[75] Inventors: Paul R. Gutowski, Tulsa; Martin L. Smith, Jr.; Carl H. Sondergeld, both of Broken Arrow, all of Okla.

[73] Assignee: Amoco Corporation, Chicago, Ill.

[21] Appl. No.: 659,111

[22] Filed: Oct. 9, 1984

[51] Int. Cl.$^4$ ............................ G01N 1/32; G01N 5/00
[52] U.S. Cl. ........................................ 367/27; 367/59; 367/46; 364/422
[58] Field of Search ..................... 367/40, 59, 60, 27; 364/421

[56] References Cited

U.S. PATENT DOCUMENTS

| | | | |
|---|---|---|---|
| 4,437,176 | 3/1984 | Mock | 367/56 |
| 4,507,577 | 3/1985 | Kwan | 328/144 |
| 4,562,540 | 12/1985 | Devanry | 364/400 |
| 4,594,662 | 6/1986 | Devaney | 364/400 |
| 4,598,366 | 7/1986 | Devaney | 364/400 |
| 4,628,492 | 12/1986 | Winney | 367/63 |

OTHER PUBLICATIONS

Kanasewich et al, "NOL-Root Stack Nonlinear . . . Filter"; Geophysics, vol. 38, #2, 4/73, pp. 327-338.

Tatham et al, "Application of . . . Reflection Data", Austr. Soc. Explor. Geophys. et al, Petrol Syrup, 2/15/83, Abst.

Brocher et al, "Inversion of the Slant Stacks . . . ", J. Geophys. Res., vol. 83, No. B8, pp. 7065-7072, 8/10/81, abst.

Li, F. S., "Application of NOL Root Filter to Velocity Spectra", 1977, p. 1519, Geophysics, 42(7).

Harding, A. J., "Inversion Methods for Slant Stacks . . . Data", 4/14/83, p. 300, Geo. J. Roy. Astro. Soc., 73(1), Abst.

Muirhead, et al, "The NOL Root Process . . . Data", 1976, pp. 197-210, R. Astro. Soc. Geophys. Jour. 47(1), Abst.

Ram, A., "NOL Root Beam Forming . . . Technique", 1979, p. A25, AEG SOL Annu. Conv., India, Abst.

Primary Examiner—Nelson Moskowitz
Attorney, Agent, or Firm—Scott H. Brown; Fred E. Hook

[57] ABSTRACT

A sonic well logging system and apparatus for determination of seismic wave velocities from a seismic wave propagating in a subterranean formation about a wellbore. The system includes the process of imparting a seismic wave into the subterranean formation about the wellbore, and receiving the seismic wave after it has interacted with the subterranean formation at a plurality of seismic receivers positioned in the wellbore. The seismic waves are transformed at each of the seismic receivers into a seismic signal and these signals nonlinearly stacked for a selected position in the wellbore to generate a velocity spectrum of seismic wave velocities. Coherency peaks are then selected from the velocity spectrum with each coherency peak having associated therewith a unique seismic wave velocity, such as P-wave, S-wave, tube wave and the like.

9 Claims, 7 Drawing Sheets

SONIC LOGGING SYSTEM

BACKGROUND OF THE INVENTION

1. Field of the Invention

The present invention relates to a system for obtaining and processing well log data and, more particularly, to such a system for determining on a real time basis seismic wave velocities in a computationally efficient manner.

2. Setting of the Invention

Geophysicists, geologists, and the like are interested in obtaining seismic wave velocities, since with these velocities one is better able to determine the likelihood of hydrocarbons being present within a given formation. Seismic wave velocities can also be used in designing fracture treatments for hydraulically fracturing a borehole to increase the permeability of the particular formation. Sonic logging can be a source of these seismic wave velocities because sonic logging provides a measurement of certain properties of a formation material around a borehole by the measuring of the velocities (or slownesses) of various seismic waves which travel through the earth, as well as certain waves guided by the borehole interface. Basically, sonic logging involves imparting seismic or acoustic energy into a borehole wall at one point and the reception of part of that energy, which has been transmitted back into the borehole, at another point. With a known distance between the transmitter and one or more receivers, the time lag between transmission and reception can be used to indicate the seismic energy's velocity or slowness (1/velocity).

In conducting sonic logging operations, it is desirable to obtain the processed results, for example, the seismic wave velocities as soon as possible so that any additional logging can be accomplished while the logging equipment is still at the well site; or, more significantly, so that hydrocarbon-bearing zones can be located and completed. However, currently the usual turnaround time, i.e., the time from logging to receipt of the processed data, is on the order of about one week to about one month. This delay is caused in part because once the logging data is obtained at the well site, it is transported or transmitted to a remote processing location. Due to the complexity of the algorithms needed to process the data, the data is processed only on large mainframe computers. The lack of real time processing, defined here as the ability to obtain processed data for interpretation from the sonic well data either as the data is being generated or immediately thereafter, generally limits the quality control of the log during the data acquisition. This quality control is a vital aspect of any logging procedure, since with real time processing one can relog a well, if needed, before the well is altered by production treatments and a log can be rerun while the required logging equipment is still at the well site.

Various sonic logging processes have been disclosed in the past; however, none of the processes known to the inventors hereof have the capability of real time processing of the data. Also, no known process uses a computationally efficient algorithm so that the data can be processed by a very easily transportable and inexpensive hardware system, such as by a microprocessor, rather than being post-processed on a large mainframe computer at a remote computing facility.

Two patents which disclose correlation techniques to derive various seismic wave velocities from sonic logging data are Ingram, U.S. Pat. No. 4,210,966, and Seaman, U.S. Pat. No. 4,367,541. Ingram discloses a correlation technique for determining acoustic wave velocities from sonic logging data and requires a point-by-point *multiplication* of successive different wave form segments for different assumed wave velocities to derive an acoustic wave velocity that produces the best correlation between successive waveform segments. This is a correlation technique which is not easily handled by small computers, such as a microprocessor because it is not a computationally efficient program. Further, there is no disclosure or suggestion within Ingram of obtaining the seismic velocity data on a real time basis, using a nonlinear Nth root stacking algorithm, or using an increasing sloped window line in stacking the signals.

Seaman discloses a method and apparatus for selecting an acoustic wave velocity from a plurality of provisional wave velocities. More particularly, acoustic wave energy from a transmitter positioned within the borehole is received at a plurality of spaced locations within the borehole. The waveform segments received at each receiver are then correlated using the Ingram technique to derive a first provisional velocity. However, unlike Ingram, a second iteration of the correlation technique of Ingram is performed on a second segment of the waveform to derive a second provisional velocity. Seaman then provides a means for selecting a final output velocity as a function of the two provisional velocities derived utilizing the Ingram correlation technique. However, Seaman indicates that various correlating techniques are available in the art and could be utilized, hence implying that the essence of Seaman is not directed toward any particular technique for correlating, but rather only a process for selecting a final output velocity from the provisional velocities derived from iterations of the Ingram technique.

Nowhere is it disclosed or suggested within Ingram or Seaman to correlate the signals from the various receivers utilizing a computationally efficient algorithm that determines the seismic wave velocities by measuring the coherency of the signal in a nonlinear fashion. This nonlinear process, as well as the minimum multiplication steps within the algorithm provide a computationally efficient algorithm that allows real time data processing, which has henceforth been unavailable. Further, there is no disclosure or suggestion of using a nonlinear Nth root stacking algorithm, or using an increasing sloped window line in stacking the signals.

Other references of note are U.S. Pat. Nos. 3,696,331; 3,424,268; 3,390,377; 3,292,729; and 3,177,467. All of these references disclose various techniques for deriving acoustic wave velocities; however, none of these references disclose or suggest a computationally efficient method for determining the wave velocities without multiplicative iterations. Also, various techniques of crosscorrelating signals to ascertain wave velocities are discussed in U.S. Pat. Nos. 3,962,674; 3,900,824; 3,696,331; and 3,622,969. Additionally, UK Pat. No. 2,107,462A; 2,111,206A; and U.S. Pat. No. 4,414,651 disclose other techniques of cross correlation to determine acoustic wave velocities. However, nowhere in any of these references is it disclosed or suggested to use a computationally efficient processing technique to obtain seismic wave velocities on a real time basis as the data is gathered. Further, there is no disclosure or suggestion of using a nonlinear Nth root stacking algorithm, or using an increasing sloped window line in stacking the signals.

SUMMARY OF THE INVENTION

Disclosed herein is a system for the determination of seismic wave velocities for a seismic wave propagating in a subterranean formation about a wellbore. By way of the system, seismic waves are imparted into the subterranean formation about the wellbore from a seismic source positioned within the wellbore. The seismic waves are received by a plurality of seismic wave receivers in the wellbore after the seismic waves have interacted with the subterranean formation. The received seismic waves are transformed at each seismic receiver into a seismic signal, and each seismic signal is then nonlinearly stacked to generate a velocity spectrum. The velocity spectrum has coherency peaks which are associated with a unique seismic wave velocity.

The process described herein is computationally efficient since the processing technique uses integers, oversamples, and takes advantage of a nonlinear stacking procedure, such as Nth root stacking, for the determination of the best fit of wave velocities without multiplicative iterations. Thus, the seismic velocity data can be processed by a computer more rapidly and also by a computer of small size, such as a microprocessor. With the computational efficiency of the process of the present invention, the data can be processed and displayed on a CRT as it is being obtained or displayed in the form of a printout for immediate use.

BRIEF DESCRIPTION OF THE DRAWINGS

FIG. 7 is a representation of an output of coherency peaks which have associated therewith the unique seismic wave velocities, such as P-wave, shear wave, tube wave and the like.

DETAILED DESCRIPTION OF THE PREFERRED EMBODIMENT

The present invention provides a system for the determination of seismic wave velocities from a seismic wave propagating in a subterranean formation about a wellbore. The process of the system includes imparting a seismic wave into the subterranean formation about the wellbore from at least one seismic source positioned within the wellbore. The seismic wave is received at a plurality of seismic receivers positioned within the wellbore after the seismic wave has interacted with the subterranean formation. As the seismic wave is received at each of the seismic receivers, the seismic wave is then transformed into seismic signals. The seismic signals are sent to the surface and are stacked nonlinearly to generate a velocity spectrum. The velocity spectrum includes coherency peaks each having associated therewith a unique seismic wave velocity, such as P-wave, shear wave, tube wave, and others known and used by those skilled in the art.

Figure 1:
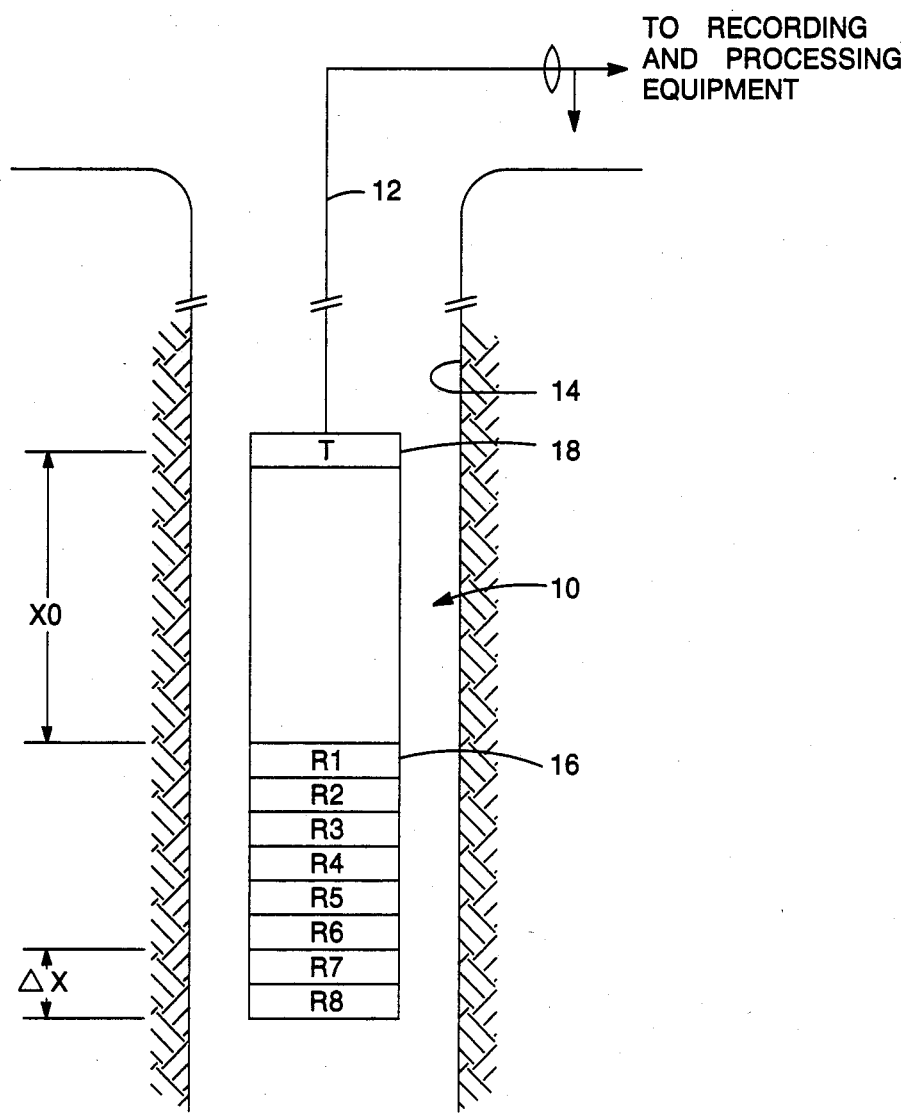
FIG. 1 is a semi-diagrammatic representation of a sonic well logging sonde disposed within a wellbore.
Figure 2:
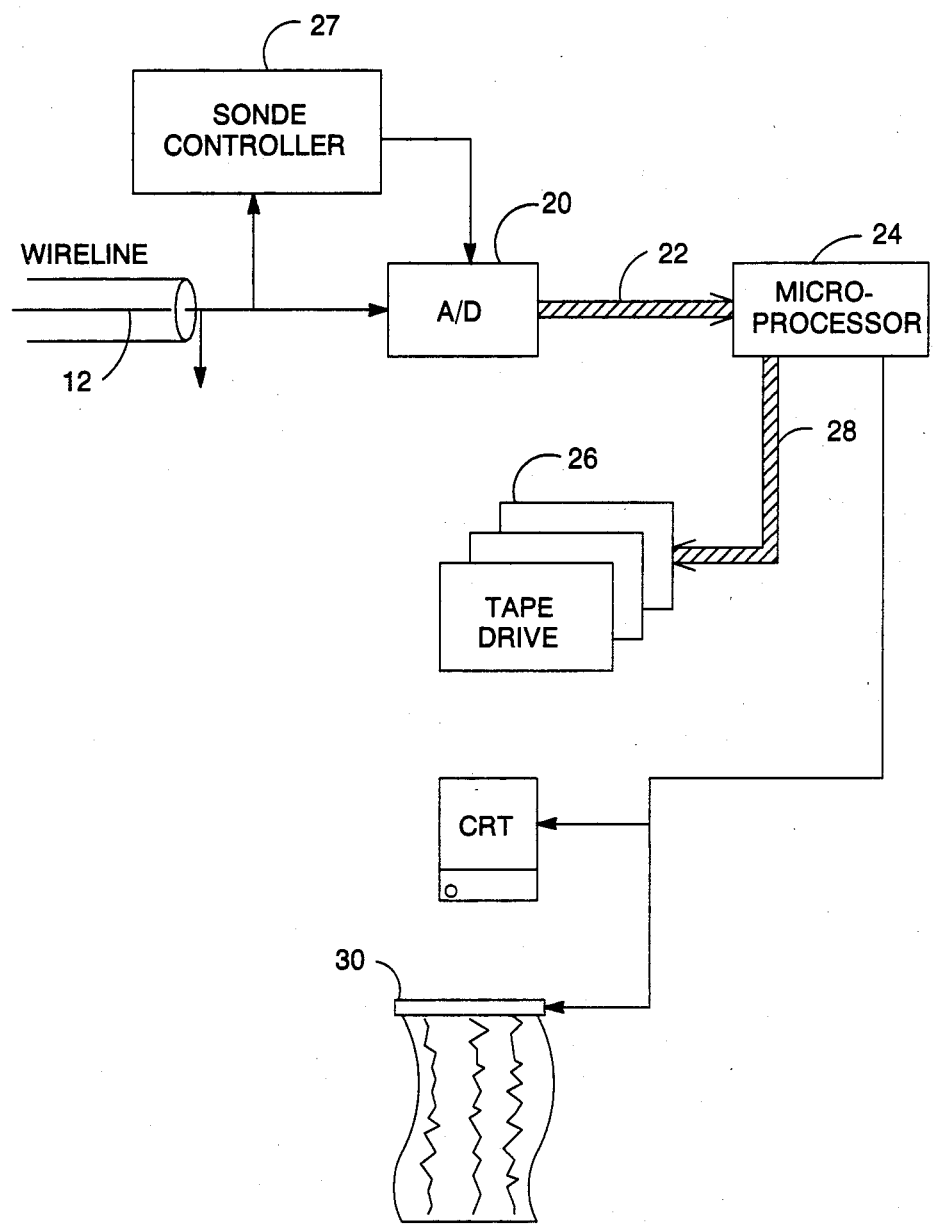
FIG. 2 is a semi-diagrammatic representation of the data processing hardware components of the system of the present invention.

As shown in FIG. 1, the downhole hardware of the sonic logging system of the present invention includes a logging sonde 10 which is suspended on a wireline 12 within a wellbore 14. The wireline 12 can be any commercially available multichannel logging wireline. The sonde 10 includes a plurality of seismic receivers 16 and at least one seismic transmitter 18. The sonde 10 can be rigid, flexible or simply a cable from which the receivers 16 and the transmitter 18 are attached.

The seismic receivers 16 used within the present invention can be of any commercially available type. The receivers 16 are spaced a known distance $\Delta x$ from each other and a known distance Xo from the transmitter 18. Generally, the distance Xo can be from about 0.5 ft to about 25 ft and the value of $\Delta x$ can be from 0.25 in. to about 12.0 in. At least two receivers are used in the present invention, with from about 4 to about 8 receivers being usual.

The seismic transmitter 18 can be of any commercially available type, but for the purposes of this discussion it will be assumed to be a magnetostrictive transmitter. The transmitting frequency of the transmitter 18 is controlled by the physical dimensions of the device and of the magnetostrictive constraints of the transmitter material. For example, the transmitter 18 can transmit a central frequency of about 30 kilohertz. The sonde 10 of the present invention can include more than one transmitter 18, and in one embodiment includes three transmitters 18 (not shown) with centered frequencies of 10, 20, and 40 kilohertz, respectively. A tunable frequency transmitter is also desirable for use within the present invention.

The transmitter 18 radiates its energy about its vertical cylindrical axis and transmits its energy out into the formation for interaction with the formation material. The transmitter 18 does not need to, but can, contact the wellbore face. As shown in FIG. 1, when the sonde 10 is not contacting the wellbore face, all of the transmitted energy first propagates through any fluid present within the wellbore 14 and then into the formation. It has been found that lower frequency transmitters 18 are desirable in wellbores where the slowness (1/velocity) is less than the formation's natural frequency because this tends to enrich the lower frequency components of the Stonely waves whose pronounced dispersions at low frequencies can be exploited to determine the shear velocity of the formation.

Asymmetrical transmitters 18 are also desirable because their radiation energy impinges on the wellbore face to generate directly propagating shear waves. Other schemes of source excitation include arbitrary wave forms and phased arrays of transmitters 18 that can be included within the sonde 10 or placed at the surface. Arbitrary wave forms allow for the alteration of the source spectrum to enhance the desired objectives, i.e., by driving the transmitters 18 with an inverse filter response to a received signal one can essentially produce a record of the spiked arrivals. Phased arrays of transmitters can be devised to sweep phase velocities in real time to determine in situ compressional shear wave velocities, as will be described in more detail below.

The firing rate of the transmitter 18 is adjustable and generally has a period of about 15 milliseconds to about 100 milliseconds. The firing rate should be sufficiently fast to eliminate any smearing of the obtained data at normal logging speeds. What is meant by this is that the firing rate should be sufficient for the signal to be sent and received at least once for each receiver with no apparent movement of the sonde 10, which could cause smearing of the seismic data as the sonde is being moved through a borehole. The sonde 10 is normally moved through the wellbore 14 at a rate of approximately 1,000–5,000 ft/hr.

The sonde 10 is operatively connected to recording and processing equipment located on the surface, which includes an analog to digital (A/D) converter 20 wherein the seismic signals from the seismic receivers 16 are converted to a digital format. The A/D converter 20 can be any commercially available unit, with at least 12-bit capability being preferable. The seismic data is digitized within the A/D converter 20 at a rate greater than theoretically needed, for example, ten times the theoretical requirement, so the velocity resolution is increased and no interpolation is required. In one embodiment of the present invention, the A/D function is part of a recording oscilloscope used to view the signals as received for testing and trouble shooting. The digitized signals from the A/D converter 20 pass via a high-speed 16-bit interface 22 to a computer 24 for processing. The computer 24 is preferably a microprocessor for ease of transportation, environmental tolerances, and for low power requirements.

After the computer 24 has processed the incoming seismic signals, as will be described below, the digitized data can be sent to visual or hardcopy display and/or some form of output or storage, such as tape, disks, bubble memories, or the like. In one embodiment of the present invention, a tape cartridge subsystem 26 is connected to the computer 24 via a high speed interface 28; such subsystem is used to store the raw, as well as processed, seismic data. One type of cartridge subsystem 26 is a three cartridge tape drive system with each removable cartridge having about 67 megabytes capacity. In this subsystem, one cartridge is recorded on, whereafter the computer 24 automatically stops that cartridge when full and starts recording the data onto a second cartridge, allowing the operator to replace the first cartridge if desired. Thus, this allows the *continuous* recording without interruptions of seismic data over the entire logged interval.

The computer 24 receives the seismic data from the A/D converter 20 at every firing or "shot" of the transmitter 18, as well as any auxiliary data received from the sonde controller 27. The sonde controller 27 controls the operation of the sonde 10 itself and also furnishes depth and time of day information to the computer 24 for record keeping purposes. The sonde controller 27 also provides the capability of varying the firing range and receiver selection, providing a record of the depth and time at which each shot was recorded, direct monitoring of depth information, and performing several auxiliary logging functions associated with measurements from other nonsonic devices on the sonde 10, such as gamma-ray logs for depth alignments.

The data processing scheme stored within the computer 24 for use in the present invention is capable of real time data processing in a computationally efficient manner. There are at least two novel features within the processing scheme which enables the data to be processed and displayed on a real time basis.

The first feature is the use of nonlinear Nth root stacking, which is very easily handled within a computer to provide enhancement of the data. The second feature is the use of window line of increasing slope in stacking the data; the feature will be described later.

Figure 3:
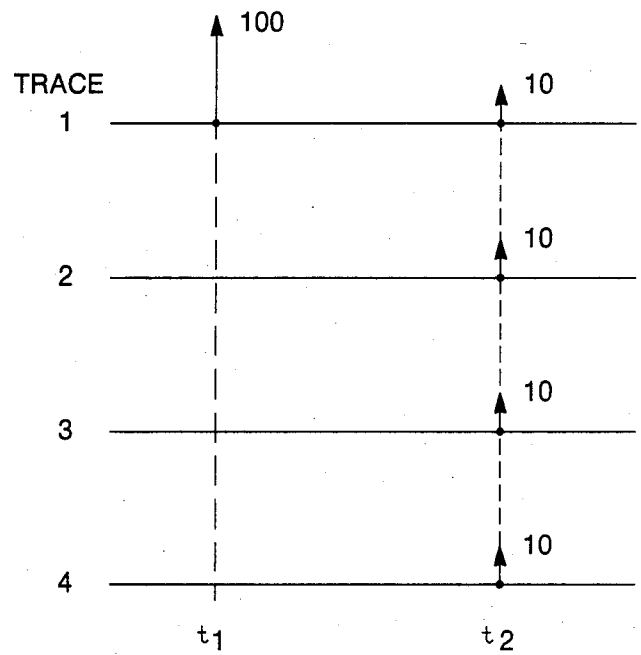
FIG. 3 is a flow chart representation of a computationally efficient algorithm used within the present invention.

Nth root stacking is used to enhance seismic data by suppressing uncorrelated noise and by sharpening an array's response and characteristics. On the outset it should be noted that because this technique is nonlinear, some distortion of the waveform will result. To illustrate the principle of Nthroot stacking, the following example is provided. If a linear array of seismometers (receivers) contains M elements, one finds the Nth root stack of the recorded traces by first delaying them according to some phase velocity, then computing:

$$Q_i = \frac{1}{M} \sum_{j=1}^{M} \text{sign}(y_{ij}) \, (y_{ij})^{1/N}$$

$$S_i = \text{sign}(Q_i) \, (Q_i)^N$$

$$\text{where sign}(x) = \begin{cases} +1 & x \geq 0 \\ -1 & x < 0 \end{cases}$$

where $y_{ij}$ is the amplitude of trace j at time i and, for efficiency, is a bounded and finite set of integers, $Q_i$ is an intermediate quantity, and $S_i$ is the Nth root stacked sample at time i. The effect of this equation is illustrated in FIG. 3, wherein traces 2 to 4 contain only a low level spike signal each at the same time represented as $t_2$. Trace 1 contains a large noise spike at $t_1$ in addition to the signal. To illustrate Nth root stacking with a value of (N=4), the process is broken into three steps. Step 1 for times $t_1$ and $t_2$ involves taking the fourth root of each trace 1 to 4. Step 2 computes the sums over the traces for times $t_1$ and $t_2$. Step 3 raises the sums to the fourth power. The Nth root factor is usually 4, but any value between 1 and 10 are usable. However, for velocity resolution purposes, a higher number is better because it tends to suppress noise. It has been found that an Nth root factor of about 4 provides the best results. After Nth root stacking, the effect of the noise spike has been greatly reduced over the reduction obtainable by simply stacking with a root of 1.

Again, the drawback is some distortion of the wave form occurs, but since the phase velocity associated with each arrival phase is needed, such distortion is not a handicap. With Nth root stacking, all of the input traces are treated as a vertical array. By stacking along lines of constant velocity, a point-by-point coherency spectrum or matrix of velocity versus time is built up. For a given array geometry, the resolution of this procedure is controlled to some degree is controlled by N.

Simple linear stacking schemes (such as Nth root stacking with a value of N=1) do not produce reliable velocity spectra because these schemes do not adequately penalize a lack of coherence between traces. Semblance-based schemes (and most other more sophisticated schemes) require large numbers of numerical computation. The Nth root stacking scheme described herein, when implemented on a computer is nearly as fast as simple addition; and it also provides discrimination between coherent and incoherent signals which is at least as good as that provided by semblance-based techniques.

A description of a logging process of the present invention will be described below. After the sonde 10 is placed within the wellbore 14, the operator inputs into the computer 24 several operating parameters, such as the wellbore's diameter, sonde diameter, fluid velocity, digitizing rate, slowness limits, slant/stack window, number of slowness (N), as well as any other desired parameters including time of day, well location, etc. The firing rate of the transmitter 18 is adjusted via the sonde controller 27 and thereafter the sonde 10 is either raised or lowered within the wellbore 14 as is well known in the industry. The resulting seismic waves received by the receivers 16 are then sent through the wireline 12 to the surface for processing. Within the processing algorithm, a complete set of received signals (one for each receiver, collected within a small range of depths) are examined collectively for coherent signals with a particular moveout and onset time. Such a signal is one that has about the same appearance from trace to trace and appears displaced along a linear line later with increasing distance from the transmitter in a specific quantitative manner associated with the signal's speed. Further, such a signal should first appear at an absolute time (time with respect to the firing of the transmitter) which is approximately consistent with its propagation speed.

In the algorithm of the present invention, a predetermined sample signal speed is entered into the computer 24 and the seismic data is processed as though such a signal is present. The result of the processing is a number which is a measure of how consistent the data was with the assumed signal speed. The output of processing at this level is a series of trial speeds. Associated with each of these trial speeds is an energy number that is large if the data appears to have a coherent signal at that speed and small if the data does not appear to have a coherent signal at that speed. The program accumulates this data in the form of a velocity spectrum and selects the major peaks therefrom and displays these peaks. Each peak is associated with a distinct wave velocity, such as P wave, shear wave, tube wave, and the like.

Figure 4:
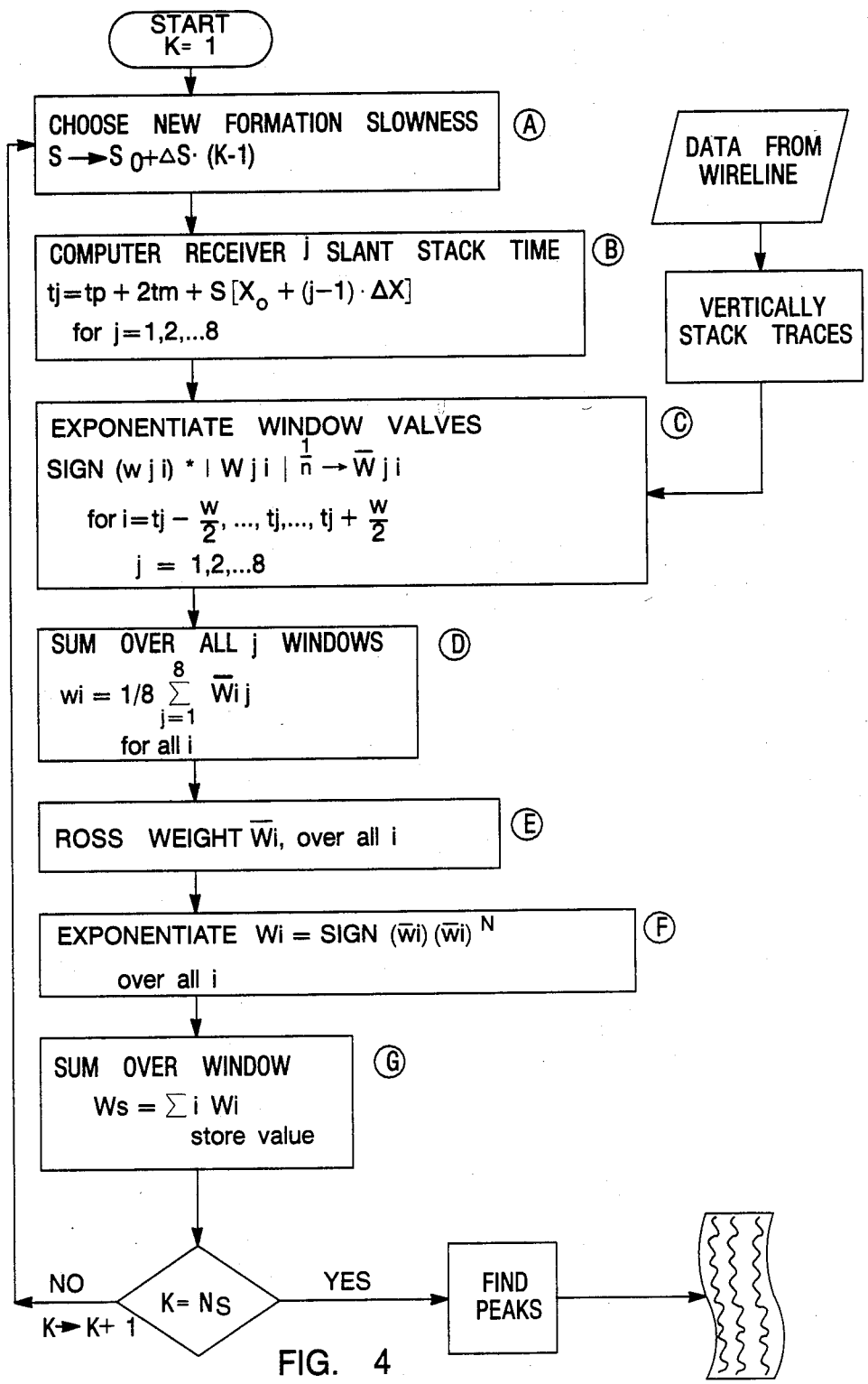
FIG. 4 is an illustration of the principle of Nth root stacking.

As shown in FIG. 4, in the first step of the algorithm, shown in Step A, a value of slowness (1/velocity) for the formation is entered into the computer 24. For example, a first trial value could be 100 microseconds/ft.

In Step B, for each trial slowness a ray-theoretical travel time is computed from the transmitter to the first or near-offset receiver which includes the mud-formation-mud ray paths. A mud acoustic speed is assumed. For each slowness, a time point on each of the traces is computed to define an imaginary line overlying the suite of received traces (seismic signals from the receivers 16).

Data windows for each of the received signals are computed in Step C for the purpose of noise reduction. These data windows are symmetric with slanted starting or arrival points and the data within the data windows are then raised to the 1/Nth power to increase the velocity resolution and to reduce noise. This slanted window line can be seen on FIG. 5, as the solid slanted line. Because the seismic pulses on the traces are emergent rather than impulsive, a pulse buildup time is chosen. A data sample window that is of a chosen width is then centered on the resultant slanted times of the traces. Each sample value within each of the windows is exponentiated, with sign retention, by 1/N.

In Step D, the sample positions within each window are summed to generate one summation window, i.e., a compression of 8 windows into 1 window.

In Step E, the summation window is weighted to smooth the result and thereby reduce extraneous peaks. By this, the extreme ends of the data in the summation window are decreased so that the data in the summation window approximates a smooth curve to reduce noise and emphasize the data in the central portion of the summation window.

In Step F, the summation window is exponentiated to the Nth power to further reduce noise and to increase the resolution of the phase by the Nth root factor.

Figure 5:
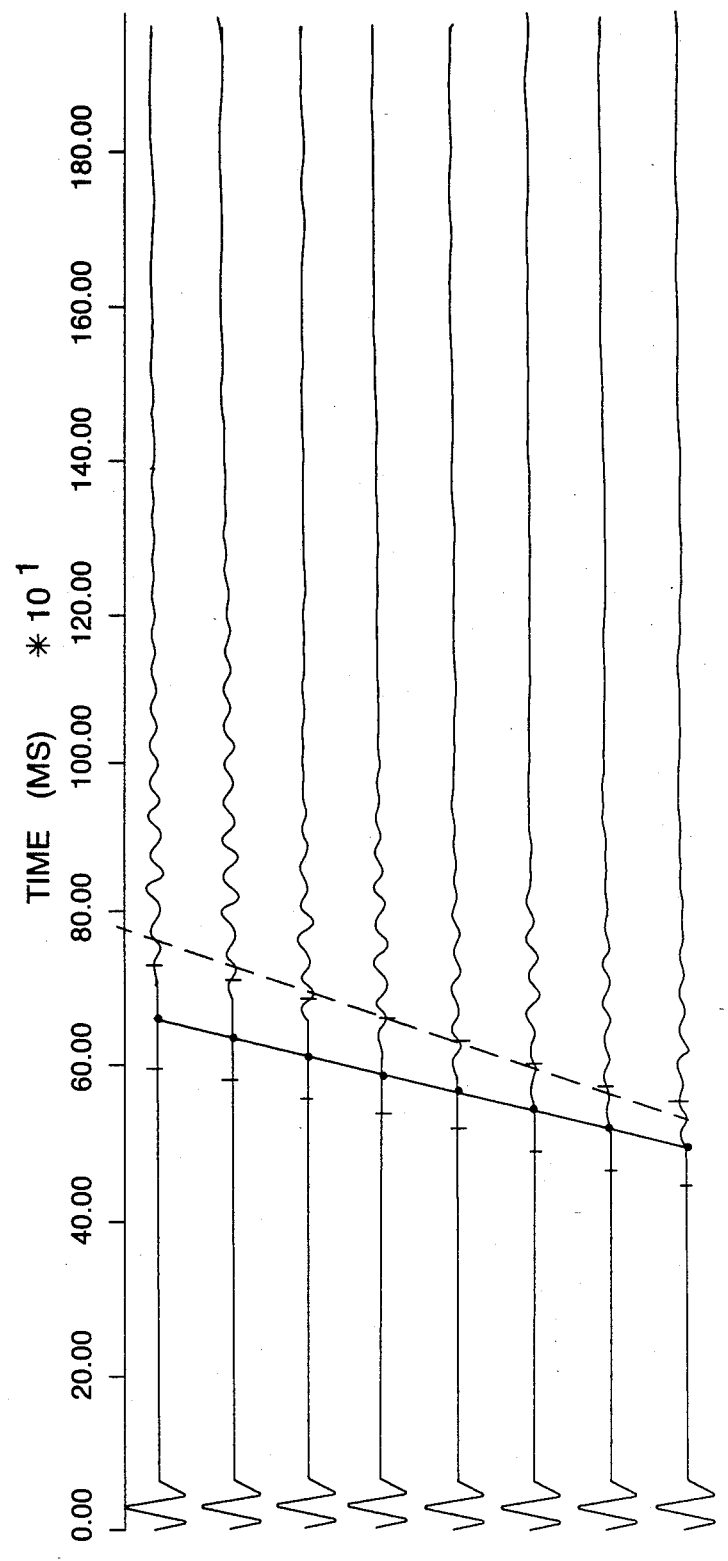
FIG. 5 is a multireceiver signal output with slanted vertical lines indicating the Nth root slant stacking technique used within the present invention.

In Step G, all of the summation window(s) are summed at a sample position governed by the particular slowness value used. Then, the slowness is increased (back to Step A) to move the slanted window line along the traces. As the slowness is increased, the new slanted window line is more slanted, as shown in FIG. 5 (with the dotted slant line to the right of the solid slanted line). Thus, the traces are being scanned for slower velocities arriving later in time. In other words, the data is stacked along a window line which intersects each of the seismic traces, where the slant of the window line increases as the velocity decreases and with increasing time along the near receiver trace.

One of the primary benefits of this slant stacking process is that there is no need to advance the windows (of a particular slowness) down the full length of all of the traces and then return for another slowness, as in Ingram and Seeman (discussed previously). Because the higher velocities desired for interpretation purposes are received first, by increasing the angle of slant (by increasing the slowness factor within the process) the process is moving the windows to be at points on the traces where it is expected to receive the desired slowness velocities. Therefore, the need for checking the whole trace at other slownesses for that particular slowness window has been eliminated. This adds to the computational efficiency of the algorithm.

Figure 6:
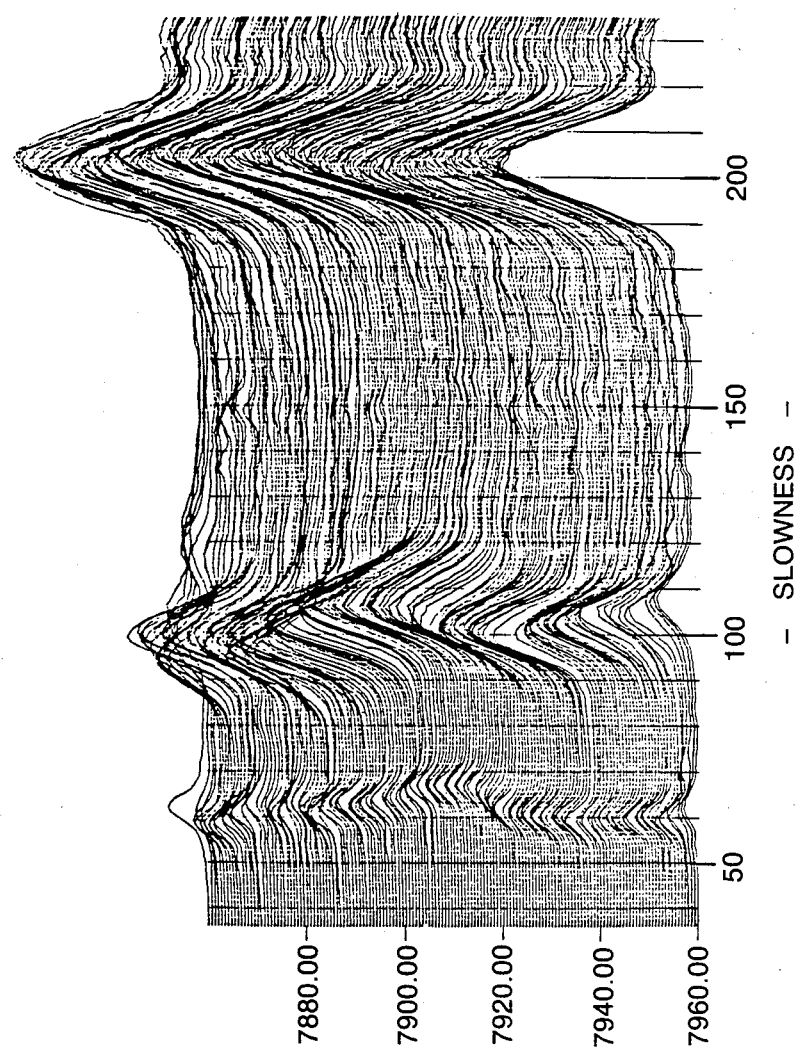
FIG. 6 is a plot of seismic signals showing their amplitude vs slowness from which the coherency peaks are determined.
Figure 7:
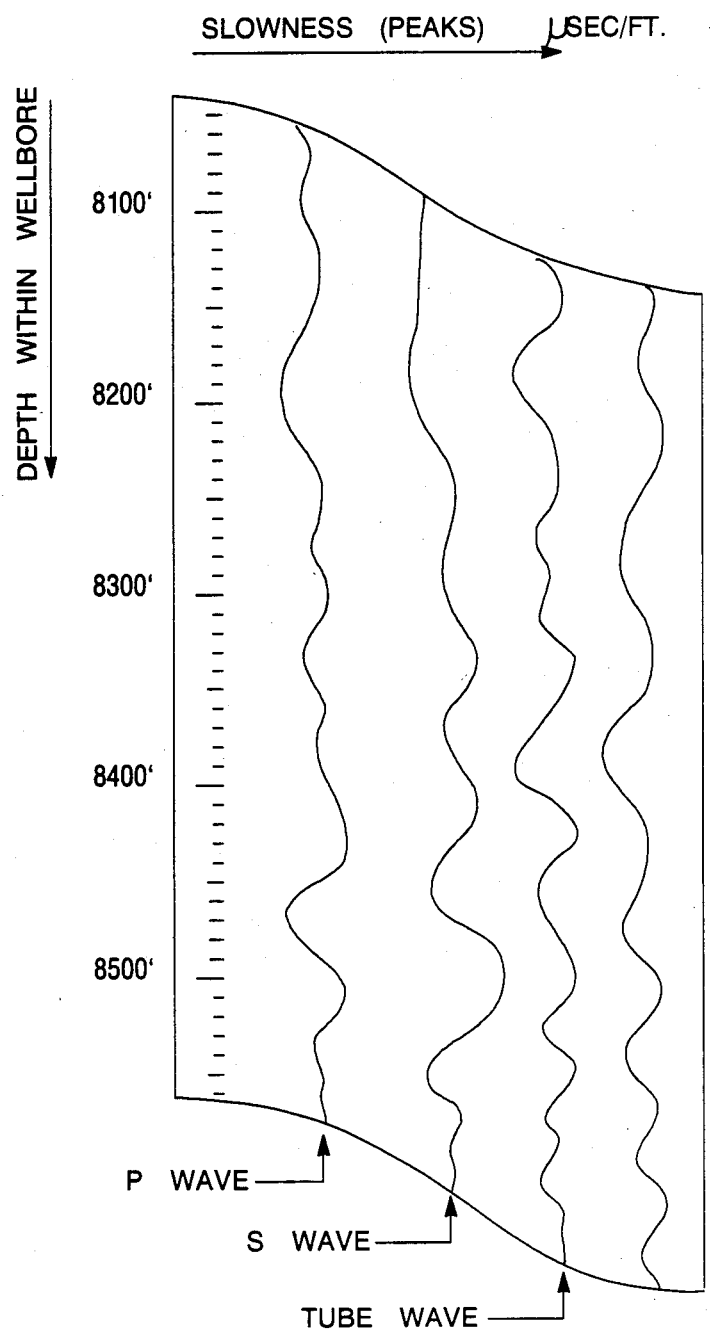

After computing the slant stacks for the slowness values desired, the data is in the form of an amplitude spectrum. The amplitude spectrum is in the form of signals plotted on their x axis as slowness vs their y axis as amplitude. As shown in FIG. 6, at a particular depth in the wellbore (such as 7,960.00') there are at least three major peaks, each having different amplitudes. The algorithm used in the present invention then locates the peaks relative to wellbore depth and slowness to develop the velocity spectrum as shown in FIG. 7 (as will be described below). The velocity spectrum is in the form of a wavy line with at least two peaks in the line. The x-axis of the velocity spectrum is slowness and the y-axis is the energy number, which is an indication of coherency. The computer 24 then scans the velocity spectrum for these peaks, presents the velocity spectrum to the operator on a real time basis for printing on a strip chart, if desired.

An example of an output of the present invention is shown in FIG. 7, wherein for a particular depth there is a point associated to the left or right along the horizontal axis which would be the slowness value, and by reviewing the movement or the relative juxtaposition of the different peaks at different depths, the operator can determine formation characteristics, as is well known in the art.

After the seismic data has been obtained, the seismic data can additionally be postprocessed at the well site.

This aspect allows the generation at the well site of an edited sonic wave log in addition to the other logs such as lithology or porosity logs that can be computed from the velocity log. Because of the real time determination of the seismic velocities, postprocessing or real time processing of the data permits the operator to examine zones of interest in more detail. For example, in some situations a casing arrival will be preferably enriched in higher frequencies than the formation P-wave arrival. In this case, an operator can filter the original time series to eliminate this arrival prior to slant stacking. Another example can be to reduce the window width used in slant stacking in an attempt to resolve discrete arrivals which are close or overlap in time. Also, the data can be processed as a subset of an array of receivers to eliminate any problems associated with a bad receiver and/or improve depth resolution.

Within the system, the velocity spectrum can also be plotted alongside the velocity log, i.e, logs of $\Delta p$, $t_p$, or $\Delta t_s$, to enhance quality control. Moreover, editing the log interactively allows the operator to quality control the P- and S- (shear) wave logs. Also, there is the capability of editing the frequency spectra. Therefore, the logs combine information such as depth, measures of coherent energy, and the spectral frequency content of the arrivals. Other guidelines such as bounds for compressional wave velocity, amplitudes of P and S, P/S can be incorporated in the postprocessing or editing schemes of the present invention.

As can be seen from the above description, the present invention provides a valuable processing system for obtaining on a real time basis seismic wave velocities for determination of formation and wellbore characteristics. Among the features described above which contribute to the real time capability are:

(a) oversampling, i.e., digitizing, the data at up to or about ten (10) times what is theoretically needed to obtain the desired velocity resolution without the need of interpolation of the data;

(b) the creation of a powered integer lookup table which permits data lookups instead of powering the data in real time;

(c) an interrupt coded routine which permits concurrent data acquisition and processing; and (d) limiting the acceptable data to integers, not floating point values or gain ranging factors.

With the capability on post processing at the wellsite, the data may be further enhanced, altered, etc., to provide timely answers for subsequent well testing or completion. This capability has not existed previously.

Wherein the present invention has been described in the particular relation to the drawings attached hereto, it should be understood that other and further modifications apart from those shown or suggested herein, may be made within the scope and spirit of the present invention.

What is claimed is:

1. A method of sonic logging for determining seismic wave velocities, comprising:
   (a) imparting a seismic wave into a subterranean formation about a wellbore from a siesmic source positioned therein;
   (b) receiving the seismic wave after it has interacted with subterranean formation, at a plurality of seismic receivers positioned in the Wellbore;
   (c) transforming the seismic wave received at each of the seismic receivers into seismic signals;
   (d) nonlinearly Nth root filtering; and
   (e) stacking each of the seismic signals within a slanted window line, of increasing slope with each incrementation which intersects each seismic signal from each of the seismic receivers to generate a velocity spectrum with coherency peaks therein, each of such coherency peaks being associated with a unique seismic wave velocity.

2. The method of claim 1 wherein the slant of the window line is increased as the seismic signals velocity decreases, with increasing time along the seismic signal of the seismic receiver closest to the seismic source.

3. The method of claim 1 wherein the coherency peaks are outputted as a function of wellbore depth.

4. An apparatus for sonic logging used in determining seismic wave velocities, comprising:
   (a) seismic source means positioned in a wellbore for imparting a seismic wave into a subterranean formation;
   (b) seismic receiver means positioned in the wellbore for receiving the seismic wave after it has interacted the subterranean formation;
   (c) means for transforming the seismic wave received at each of the seimic receivers into seismic signals;
   (d) means for nonlinearly Nth root filtering each of the seismic signals; and
   (e) means for stacking each of the seismic signals within a slanted window line of increasing slope with each incrementation which intersects each seismic signal from each of the seismic receivers to generate a velocity spectrum with coherency peaks therein, each of such coherency peaks being associated with a unique seismic wave velocity.

5. The apparatus of claim 4 wherein the slant of the window line is increased as the seismic signals velocity decreases, with increasing time along the seismic signal of the seismic receiver means closest to the seismic source means.

6. The apparatus of claim 4 including means for outputting the coherency peaks as a function of wellbore depth.

7. A sonic logging apparatus for determining seismic wave velocities, comprising:
   (a) an elongated device for suspension in a wellbore from a wireline;
   (b) a seismic source mounted to the elongated device for imparting a seismic signal into a subterranean formation about the wellbore;
   (c) a plurality of seismic receivers mounted in spaced relation to the elongated device for receiving the seismic wave from the seismic source after it has interacted with the subterranean formation;
   (d) electrical means in operative communication with the seismic receivers through the wireline for transforming the seismic wave received at each of the seismic receivers into seismic signals;
   (e) computer means for nonlinearly Nth root filtering each of the seismic signals; and
   (f) computer means for stacking each of the seismic signals within a slanted window line of increasing slope with each incrementation which intersects each seismic signal from each of the seismic receivers to generate a velocity spectrum with coherency peaks therein, each of such coherency peaks being associated with the unique seismic wave velocity.

8. The apparatus of claim 7 and including means for outputting the coherency peaks as a function of wellbore depth.

9. A seismic velocity log made in accordance with the method of claim 1.

* * * * *